P. PLANT.
SPRING VENTILATING SADDLE.
No. 15,744. Patented Sept. 16, 1856.
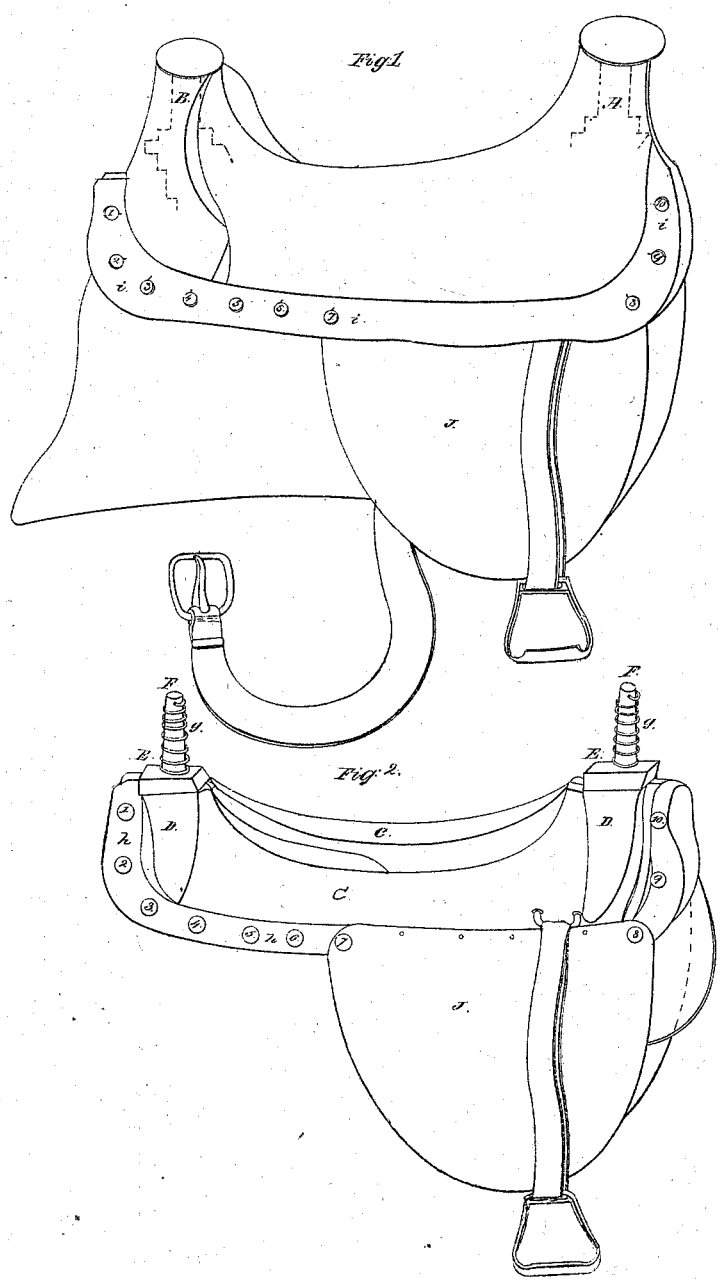

UNITED STATES PATENT OFFICE.

PASCAL PLANT, OF CHICAGO, ILLINOIS.

RIDING-SADDLE.

Specification of Letters Patent No. 15,744, dated September 16, 1856.

*To all whom it may concern:*

Be it known that I, PASCAL PLANT, of Chicago, in the county of Cook and State of Illinois, have invented and made certain new and useful Improvements in Riding-Saddles, which I term the "Spring Ventilating-Saddle;" and I do hereby declare that the following is a full, clear, and exact description of the same, reference being had to the accompanying drawings, making a part of this specification.

Figure 1, shows the saddle complete, Fig. 2 represents a lower or secondary tree or framing, having the skirts and stirrups attached thereto.

The nature of my invention consists in constructing a saddle with a compound or double tree wherein the pommel front of the upper tree is formed with a socket or recess or hollow as indicated by the dots at A, and the cantle part of the tree is formed with a socket connection as at B, Fig. 1. This form of upper saddle tree may be made of wood or of thin cast metal, and lined or padded on its under side. Next a secondary tree or framing is formed of wood or of cast metal, the bars C, C, being somewhat similar to the bars of the ordinary saddle tree, but to the pommel front and to the cantle bow part are formed attachments which I term bow, or straddle plates, D, D, having flat rectangular formations E, E, with vertical shanks F, F, around which are placed spiral springs $g$, $g$, and over all of which fits the main or seat tree framing, showing the two trees or framings combined, and forming the compound or double spring saddle tree, and also the perfect combination of the two trees, which are confined or united together by buttons, or hooks 1, 2, 3, 4, 5, 6, 7, 8, 9, 10, attached to a skirt strip $h$, $h$, fastened on to the secondary, or under tree, with the skirt J, Fig. 2, and buttoning or hooking on to the jockey strip $i$, $i$, Fig. 1, and presenting the saddle in complete shape as at Fig. 1. The saddle seat and framing or tree, being covered with leather or other suitable material as desired. Thus the peculiar application of the spiral springs within the socket places afford the great feature of improvement and utility thereof, and thereby affording the rider of an animal carrying my saddle uniform ease and comfort, and accommodating the position of the rider to the forward and backward action of the front and back springs, in the movements of the animal, and at the will of the rider. The rider may avail himself of the direct up and down elasticity, or forward and backward, or rocking motion of the saddle, as required. Besides, too, owing to the great simplicity of construction, and the application of the detachable spirals, stiffer or weaker springs can be readily substituted one for the other, and thus admitting of any degree of elasticity which a heavy or light rider may require, in which case all that is essential is to unhook or unbutton and detach the upper and lower trees and change the springs, extra pairs of which and of any desired flexibility may be always at hand.

Another very decided and most important feature of improvement claimed for my spring saddle is the fact that by using the secondary or under tree or framing as shown at Fig. 2, the pressure or weight of the saddle and rider is thrown entirely off the spinal column and completely prevents bruising, chafing and galling; and as there is a space between the seat of the saddle and the under tree, and owing to the elastic action of the two frames, the movement of the animal or rider causes the saddle to act on the principle somewhat of a bellows, drawing in air beneath the jockey strip $i$, $i$, $i$ and the seat part by the upward elastic action, and expelling it through the same source by the downward action of the seat, cooling the back, and thus most effectually counteracting the heating and sweating of the animal's back, which can not be brought about by the use of any saddle heretofore employed.

Another decided advantage of my improvements is that the construction thereof is the most simple, expeditious, cheap, and generally applicable, light, and durable, of any ever used, as has been fully demonstrated by repeated experiment and use.

Having described the nature and construction of my improvements, and also shown the several parts thereof, and disclaiming entirely the primary principle of applying spiral springs to saddles, and also disclaiming the use of inclosed compressed air spring saddles, both principles of which have long since been well known and used.

What I do claim however as new, and as the distinguishing features of improvement, and desire to secure by Letters Patent of the United States, is—

The sockets A, B, and vertical shanks F F, provided with removable springs $g$, $g$, arranged in the manner, and for the purpose specified.

PASCAL PLANT. [L. S.]

Witnesses:
   JOHN S. GALLAHER, Jr.,
   HIRAM AYRES.